United States Patent
Weihnacht et al.

(10) Patent No.: US 11,359,917 B2
(45) Date of Patent: Jun. 14, 2022

(54) METHOD FOR NON-DESTRUCTIVE TESTING OF WALLS OF COMPONENTS

(71) Applicant: FRAUNHOFER-GESELLSCHAFT ZUR FOERDERUNG DER ANGEWANDTEN FORSCHUNG E.V., Munich (DE)

(72) Inventors: Bianca Weihnacht, Dresden (DE); Tobias Gaul, Dresden (DE); Uwe Lieske, Dresden (DE); Lars Schubert, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 134 days.

(21) Appl. No.: 15/930,524

(22) Filed: May 13, 2020

(65) Prior Publication Data
US 2020/0363196 A1     Nov. 19, 2020

(30) Foreign Application Priority Data

May 14, 2019 (DE) .................... 10 2019 206 993.2

(51) Int. Cl.
*G01N 29/07* (2006.01)
*G01N 29/22* (2006.01)
(Continued)

(52) U.S. Cl.
CPC ............. *G01B 17/02* (2013.01); *G01N 29/07* (2013.01); *G01N 29/223* (2013.01);
(Continued)

(58) Field of Classification Search
CPC ........ G01B 17/02; G01N 29/11; G01N 29/07; G01N 29/245; G01N 29/043;
(Continued)

(56) References Cited

U.S. PATENT DOCUMENTS 8,806,949 B2 * 8/2014 Niese ........................ B06B 1/04
73/643
9,207,213 B2 * 12/2015 Barshinger .......... G01N 29/223
(Continued)

FOREIGN PATENT DOCUMENTS

DE        4223470       1/1994
DE    102004053112       5/2006
(Continued)

OTHER PUBLICATIONS

German Office Action.
European Search Report dated Oct. 13, 2020.

*Primary Examiner* — Jacques M Saint Surin
(74) *Attorney, Agent, or Firm* — Jacobson Holman PLLC

(57) ABSTRACT

A method for non-destructive testing of walls of components, at least one ultrasonic transducer (1) which is fixed to a surface of the wall is used to emit horizontally polarized transverse waves (3) in a lateral propagation direction and compression waves or vertically polarized transverse waves (6) in a radial propagation direction. The at least one ultrasonic transducer (1) and/or at least one further ultrasonic transducer arranged at a known distance from the at least one ultrasonic transducer (1) on the respective wall of the component (2) is/are used to detect horizontally polarized transverse waves (4) reflected by defects and compression waves or vertically polarized transverse waves (7) after or while running the non-destructive testing of the wall in order to determine the respective wall thickness.

5 Claims, 3 Drawing Sheets

(51) Int. Cl.
*G01N 29/24* (2006.01)
*G01B 17/02* (2006.01)

(52) U.S. Cl.
CPC ..... *G01N 29/245* (2013.01); *G01N 2291/011* (2013.01); *G01N 2291/0234* (2013.01); *G01N 2291/0289* (2013.01); *G01N 2291/02854* (2013.01); *G01N 2291/101* (2013.01); *G01N 2291/2634* (2013.01)

(58) Field of Classification Search
CPC ........... G01N 29/223; G01N 2291/011; G01N 2291/101; G01N 2291/0234; G01N 2291/2634; G01N 2291/0421; G01N 2291/0422; G01N 2291/0289; G01N 2291/044; G01N 2291/02854; G01N 2291/0258
USPC .......................................................... 73/582
See application file for complete search history.

(56) References Cited

U.S. PATENT DOCUMENTS

| | | | |
|---|---|---|---|
| 9,803,976 B2 * | 10/2017 | Simonetti | G01B 17/02 |
| 2009/0260442 A1 | 10/2009 | Hara | |
| 2009/0303064 A1 * | 12/2009 | LaBreck | G01N 29/30 340/678 |
| 2011/0067497 A1 * | 3/2011 | Grubb | G01N 29/075 73/623 |
| 2012/0103097 A1 | 5/2012 | Lopez Jauregui | |
| 2012/0240681 A1 | 9/2012 | Lopez Jauregui | |
| 2016/0003780 A1 * | 1/2016 | Altpeter | G01L 1/255 73/622 |
| 2018/0231504 A1 * | 8/2018 | Huang | G01N 29/0672 |

FOREIGN PATENT DOCUMENTS

| | | | |
|---|---|---|---|
| DE | 102004053584 | 6/2006 | |
| EP | 2407251 A1 * | 1/2012 | ............ B06B 1/04 |

* cited by examiner

METHOD FOR NON-DESTRUCTIVE TESTING OF WALLS OF COMPONENTS

BACKGROUND OF THE INVENTION

The invention relates to a method for the non-destructive testing of walls running around the periphery of components. It can be used, in particular, to test pipes, internally hollow containers, rotor blades, aircraft wings and other components preferably having a closed geometry. The wall of the components may be composed of different materials, in particular steel.

Infrastructure must be regularly tested for damage if it is critical. This is stipulated in policies. For the applications considered here, this damage is cracks, corrosion phenomena, wall erosion, pitting, holes and delamination. These must be able to be reliably detected as of a relevant size in order to ensure the safety of the infrastructure.

In practice, there are various possibilities both for a non-destructive test and for permanent monitoring (sensors and actuators remain on the component). Ultrasonic testing, thermography, eddy current methods, radiography, visual inspection, sound emission and many more have become established as methods of testing. The ultrasonic methods are relevant to the invention.

There are likewise specific requirements imposed on the test for testing pipelines and containers. These requirements generally vary from sector to sector and are carried out as part of reviews. For non-destructive testing measurements, a number of shear wave testing systems are available but currently cannot be used for permanent monitoring (the measurement system remains on the component). These are sensor sleeves with shear wave transducers.

However, these known sleeves are not simultaneously used for a wall thickness measurement/wall erosion measurement.

Therefore, the object of the invention is to carry out possibilities for an extended non-destructive test on walls of components, which can be used to check a plurality of different parameters using a common measurement setup.

SUMMARY OF THE INVENTION

According to the invention, the object is achieved with a method having the features of the claims.

In the method according to the invention for the non-destructive testing of walls of components, at least one ultrasonic transducer which is fixed to a surface of the wall is used to emit transverse waves, which are horizontally polarized with respect to the surface of a respective component, in a lateral propagation direction and to emit compression waves or transverse waves, which are vertically polarized with respect to the surface of a respective component, in a manner perpendicular thereto.

The horizontally polarized transverse waves, which can also be referred to as shear waves, are emitted in this case substantially parallel to the central longitudinal axis and are guided on the surfaces of the respective wall. In contrast to this, the compression waves or vertically polarized transverse waves are emitted substantially perpendicular to the central longitudinal axis of the respective wall.

The at least one ultrasonic transducer or at least one further ultrasonic transducer arranged at a known distance from the at least one ultrasonic transducer on the respective wall of the component is used to detect horizontally polarized transverse waves reflected by defects and compression waves or vertically polarized transverse waves after or while running around the periphery of the wall in order to determine the respective wall thickness. In this case, the horizontally polarized transverse waves can be emitted in a direction parallel to the surface and can be detected after reflection. Vertically polarized transverse waves run over the periphery to the at least one ultrasonic transducer or to a further ultrasonic transducer, usually in the same orientation as the one ultrasonic transducer.

In this case, the amplitude and/or the travel time of horizontally polarized transverse waves reflected by defects and the amplitude and/or the travel time of compression waves or vertically polarized transverse waves after or while running around the periphery should be detected in order to determine the respective wall thickness.

If the ultrasonic waves are emitted and also detected by the at least one ultrasonic transducer, the emission and the detection should be carried out in alternation, with the result that detection is carried out at times in which there is no emission.

If ultrasonic waves are only emitted using the at least one ultrasonic transducer and are only detected using at least one further ultrasonic transducer arranged at a known distance, emission and detection can be carried out at the same time.

Further ultrasonic transducers may be positioned on the respective wall in such a manner that they detect either horizontally polarized transverse waves in a lateral propagation direction or compression waves or vertically polarized transverse waves in a tangential propagation direction.

Horizontally polarized transverse waves should preferably be emitted in a lateral propagation direction and compression waves or vertically polarized transverse waves should preferably be emitted in a tangential propagation direction with a frequency in the range of 10 kHz to 1 MHz.

Horizontally polarized transverse waves can preferably be used to determine defects/damage and compression waves or vertically polarized transverse waves which run around in a tangential manner can preferably be used to determine the wall thickness of the respective wall of the component.

At least one ultrasonic transducer which is embedded or laminated in an elastically deformable material can be used. This can also be applied to at least one further ultrasonic transducer. In this case, the at least one ultrasonic transducer and possibly also at least one further ultrasonic transducer can be fastened, preferably releasably, by means of a sleeve running over the periphery of the respective wall. An elastically deformable material may be a polymer, for example.

A wide variety of ultrasonic transducers which are known per se can be used in principle. However, ultrasonic transducers having a rectangular ceramic plate-shaped element made of piezoelectric ceramic, which is provided with electrodes on two opposite surfaces, should preferably be used. Such ultrasonic transducers which are used to emit ultrasonic waves should be fixed to the wall in such a manner that the horizontally polarized transverse waves can propagate in the lateral/axial direction.

The ultrasonic transducers which can be used here can be used both as an actuator and as a sensor. The two wave components generated can be adjusted by changing the aspect ratio and/or the choice of the frequency of the emitted ultrasonic waves, with the result that the monitoring task or the non-destructive test can be carried out in an optimum manner. These are two types of waves which are also generated and detected again using only one ultrasonic transducer.

At least one ultrasonic transducer can emit horizontally polarized transverse waves (shear waves) in the lateral direction, which transverse waves propagate inside the respective component wall and are reflected by defects/damage, such as in particular cracks or holes, and are reflected back to the at least one ultrasonic transducer. It is therefore possible to detect these defects/this damage. In this case, the sphere of influence depends on the respective ultrasonic transducer and its opening angle.

At the same time, compression waves and/or vertically polarized transverse waves are emitted perpendicular thereto in a tangential propagation direction, which waves propagate on both sides over the periphery of the respective wall of the component. These waves likewise run back to at least one ultrasonic detect transducer and are detected there. As a result of the type of waves, the propagation speed of which depends on the frequency and the wall thickness (guided waves), the detected signals contain integral information relating to wall erosion, corrosion and wall thickness on the periphery at the position at which the at least one ultrasonic transducer is fixed to the respective component wall. In this case, the sphere of influence depends on the transducer, the frequency of the ultrasonic waves which is used for the emission and the opening angle of the at least one ultrasonic transducer and describes the component section in which the wall thickness influences the measurement result and can therefore be measured.

The size of a defect/damage can therefore be inferred using the detected amplitudes and the location of a possible defect/damage can be inferred from the travel time which has elapsed from the beginning of the emission to the beginning of detection.

The ratio of the energy of the emitted wave modes in the vertical or horizontal direction can be adjusted or adapted to the structure using the dimension of the at least one ultrasonic transducer, which may be a piezoelectric transducer element, or the frequency at which ultrasonic waves are emitted. The decisive factor for this is the wavelength of the emitted ultrasonic waves at the selected excitation frequency (mode tuning) and the underlying wall thickness of the respective component. If an integer multiple of half the wavelength of a wave mode is identical to the dimension of the at least one ultrasonic transducer used in the propagation direction of the emitted ultrasonic waves, the energy is minimal. If an odd multiple of half the wavelength of a wave mode is identical to the dimension of the at least one ultrasonic transducer in the propagation direction, the energy is maximal.

The amplitude ratio can therefore be adjusted using the dimension of the at least one ultrasonic transducer for a particular frequency and wall thickness of the respective component or by varying the frequency of the emitted ultrasonic waves in the case of a particular aspect ratio of the at least one ultrasonic transducer.

Two measurement tasks can also be performed at the same time using the invention. This is associated with a considerably reduced financial outlay (reduced number of cables and measurement channels). Furthermore, the ultrasonic transducers used can be optimized for the respective component for each test task by selecting a suitable emission ratio between the two ultrasonic transducers and/or the types of waves used can be individually adapted. In the case of longer travel paths for the horizontally polarized transverse waves and smaller component diameters, the available energy can be divided in favour of the horizontally polarized transverse waves, for example, with the result that higher powers and amplitudes can be used there than is the case with the vertically polarized transverse waves.

DESCRIPTION OF THE DRAWINGS

The invention shall be explained in more detail by way of example below and in the figures.

DETAILED DESCRIPTION OF THE INVENTION

Figure 1:
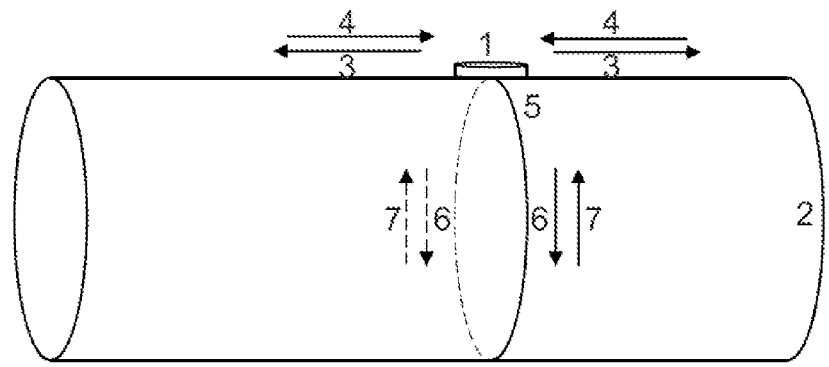
FIG. 1 shows a schematic form of a measurement setup suitable for carrying out the method according to the invention, with an explanation of the functionality.

FIG. 1 shows a measurement setup which can be used to carry out the method, with the measurement principle.

In this case, an ultrasonic transducer 1 is fixed to an outer lateral surface of a pipe as a component 2. The ultrasonic transducer 1 is connected to an electrical voltage source (not shown) and is operated with an electrical AC voltage at a predefined frequency, with the result that ultrasonic waves are emitted by said transducer. In addition, in this embodiment, the transducer is connected to an electronic evaluation unit (not shown) which is designed to evaluate ultrasonic waves 3, 4, 6 and 7 detected using the ultrasonic transducer 1, which relates, in particular, to their amplitude and/or travel time.

During the emission of ultrasonic waves, laterally emitted horizontally polarized transverse waves 3 are emitted once and propagate in the wall of the pipe 2, which is indicated with arrows. Said waves can be used for the non-destructive testing of defects, for example cracks. For this purpose, waves 4 which are reflected by a defect and contain damage information can be detected using the ultrasonic transducer 1 at times at which ultrasonic waves are not emitted. The type and position of a defect can be inferred from the travel time and amplitude of the detected ultrasonic waves. This can be carried out by means of the electronic evaluation unit.

As can be gathered from FIG. 1, horizontally polarized transverse waves 3 can be emitted in two opposite directions and ultrasonic waves 4 reflected back from there can be detected.

In this case, the sphere of influence depends on the respective ultrasonic transducer 1 and its opening angle.

The ultrasonic transducer 1 can be used to simultaneously also emit vertically polarized transverse waves 6 and 7 which run along the periphery of the component 2 and reach the ultrasonic transducer 1 again. In interaction with the electronic evaluation unit, the wall thickness of the component 2, in particular, can be determined, with the result that suitable measured values can be obtained in this direction for the purpose of determining a condition of the respective component 2.

As a result of the type of ultrasonic waves, the propagation of which depends significantly on the choice of the frequency and the wall thickness (guided waves), the detected signals contain integral information relating to wall erosion, corrosion and wall thickness on the periphery at the transducer position. The sphere of influence depends in this case on the respective ultrasonic transducer 1, the exciting frequency and the opening angle of the transducer and describes the component section in which the wall thickness influences the measurement result and can therefore be measured.

In order to determine faults in the axial direction of the component wall, horizontally polarized transverse waves 4 reflected by defects, faults or changes in the reception signal can be evaluated. The travel time of the compression waves or vertically polarized transverse waves can be evaluated in the component peripheral direction, and the wall thickness can be determined on the basis of the propagation speed of the L(0,2) wave mode determined using the travel time on the basis of the dispersion curves. This can be gathered from FIG. 2 for different wall thicknesses.

Figure 2:
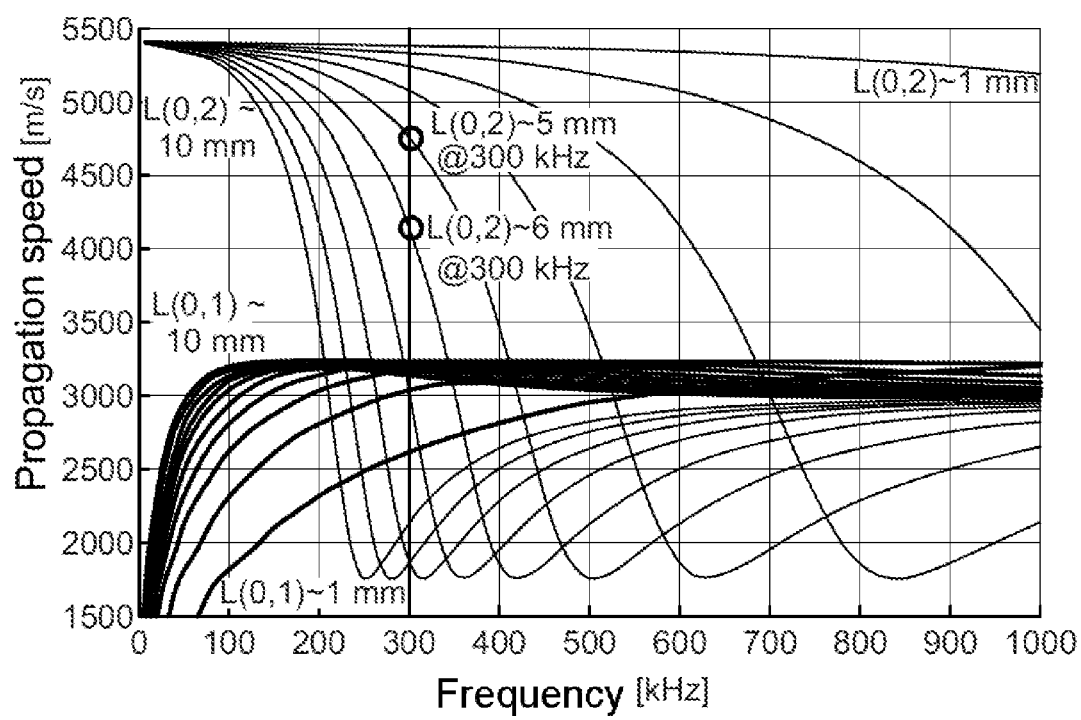
FIG. 2 shows a graph illustrating the dependences of the propagation speed on the frequency, the emitted ultrasonic waves and the wall thickness of the respective component wall.

The change in the propagation speed is illustrated in FIG. 2. Minor faults in the peripheral direction can also likewise be determined by means of changes in the reception signal.

For example, the propagation speed of the L(0,2) mode at 300 kHz and for a wall thickness of 6 mm is approximately 4200 m/s and is approximately 4750 m/s for a wall thickness of 5 mm.

Experimental investigations were carried out using an ultrasonic transducer 1 having dimensions of 25 mm×16 mm on the outer lateral surface of a pipe having an outer diameter of 219.3 mm and a wall thickness of 8 mm. Ultrasonic waves were emitted between 75 kHz and 190 kHz in 5 kHz steps, with the result that a frequency dependence becomes discernible.

Figure 3:
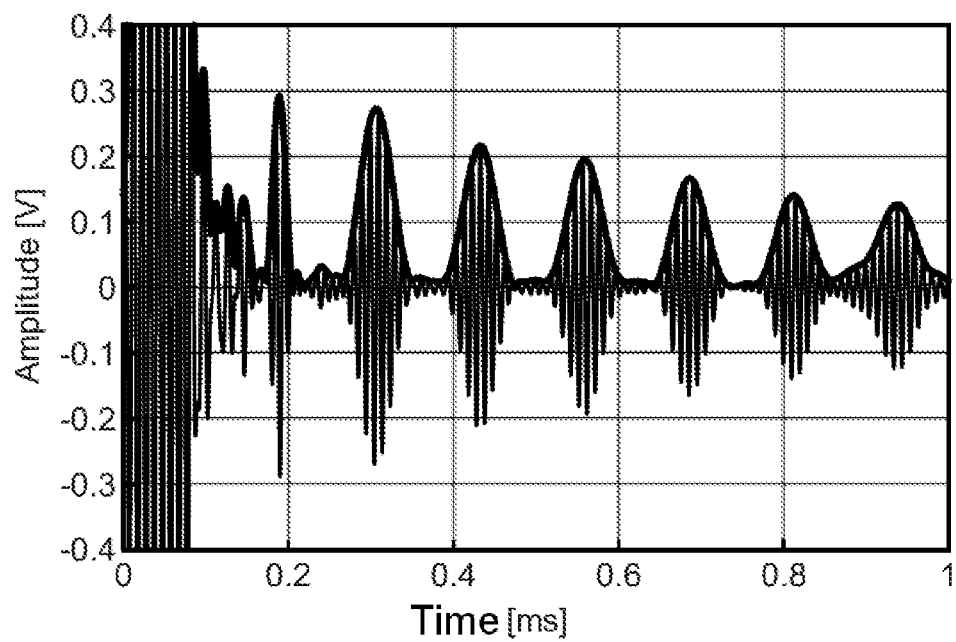
FIG. 3 shows a graph of the temporal profile of the amplitude of ultrasonic waves emitted using at least one ultrasonic transducer at a frequency of 100 kHz.

The ultrasonic waves 6 and 7 propagating in the pipe peripheral direction can be recorded as periodic echo at the ultrasonic transducer 1, which can be gathered from FIG. 3 which shows, by way of example, a time signal at the ultrasonic transducer 1 at an excitation frequency of 100 kHz.

The propagation speed of the wave mode L(0,2) can be determined from the time differences of the vertically polarized transverse waves 6 and 7 running around and can be compared with theoretically determinable dispersion curves, and the wall thickness of the respective component 2 can therefore be determined.

Figure 4:
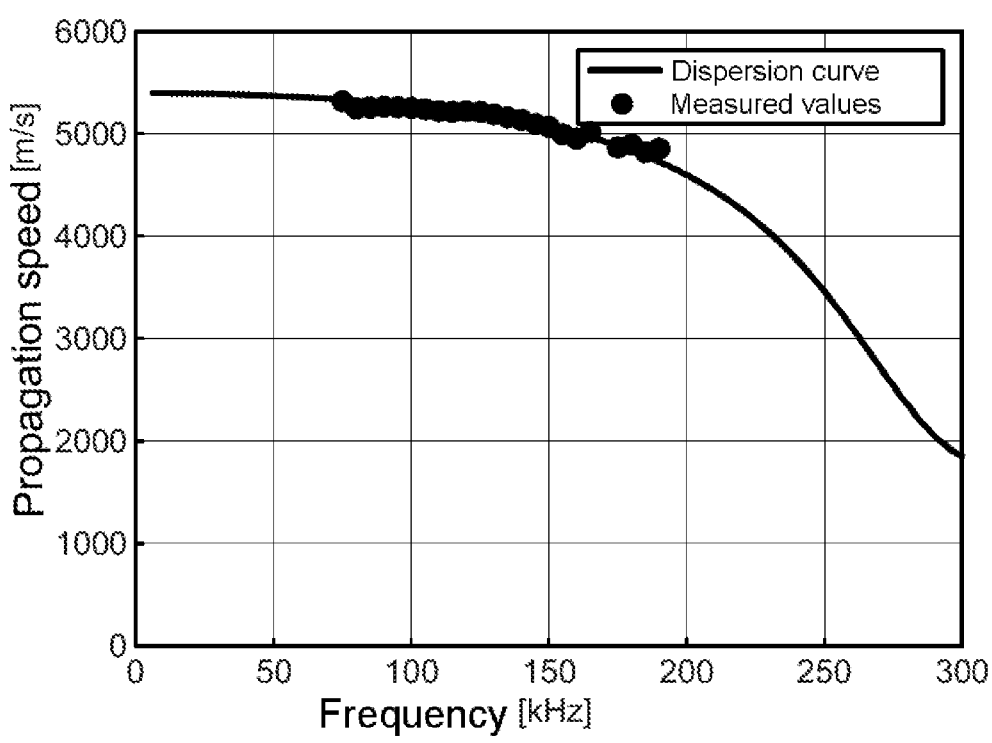
FIG. 4 shows a graph of the propagation speed of emitted ultrasonic waves against the frequency, wherein the actual propagation speed (measured values) is contrasted with the theoretical propagation speed (dispersion curve) for steel pipe having an outer diameter of 219.3 mm and a wall thickness of 8 mm.

FIG. 4 illustrates superimposition of the measured propagation speed at different frequencies with the theoretical dispersion graph for a steel pipe with an outer diameter of 219.3 mm and a wall thickness of 8 mm.

The ratio of the energy of the emitted wave modes in the transverse and longitudinal directions can be adjusted or adapted to the structure using the dimension of the ultrasonic transducer 1, which may be a piezoelectric transducer element, or the transmission frequency. The decisive factor for this is the wavelength of the emitted ultrasonic waves at the selected excitation frequency (mode tuning) and the underlying wall thickness of the respective component 2. If a multiple of the wavelength of a wave mode is identical to the dimension of the ultrasonic transducer 1 used in the propagation direction of the emitted ultrasonic waves, the energy is minimal. If a multiple of half the wavelength of a wave mode is identical to the dimension of the ultrasonic transducer 1 in the propagation direction, the energy is maximal.

The amplitude ratio can therefore be adjusted using the dimension of the ultrasonic transducer 1 for a particular frequency and wall thickness or by varying the frequency of the emitted ultrasonic waves in the case of a particular aspect ratio of the ultrasonic transducer 1.

Figure 5:
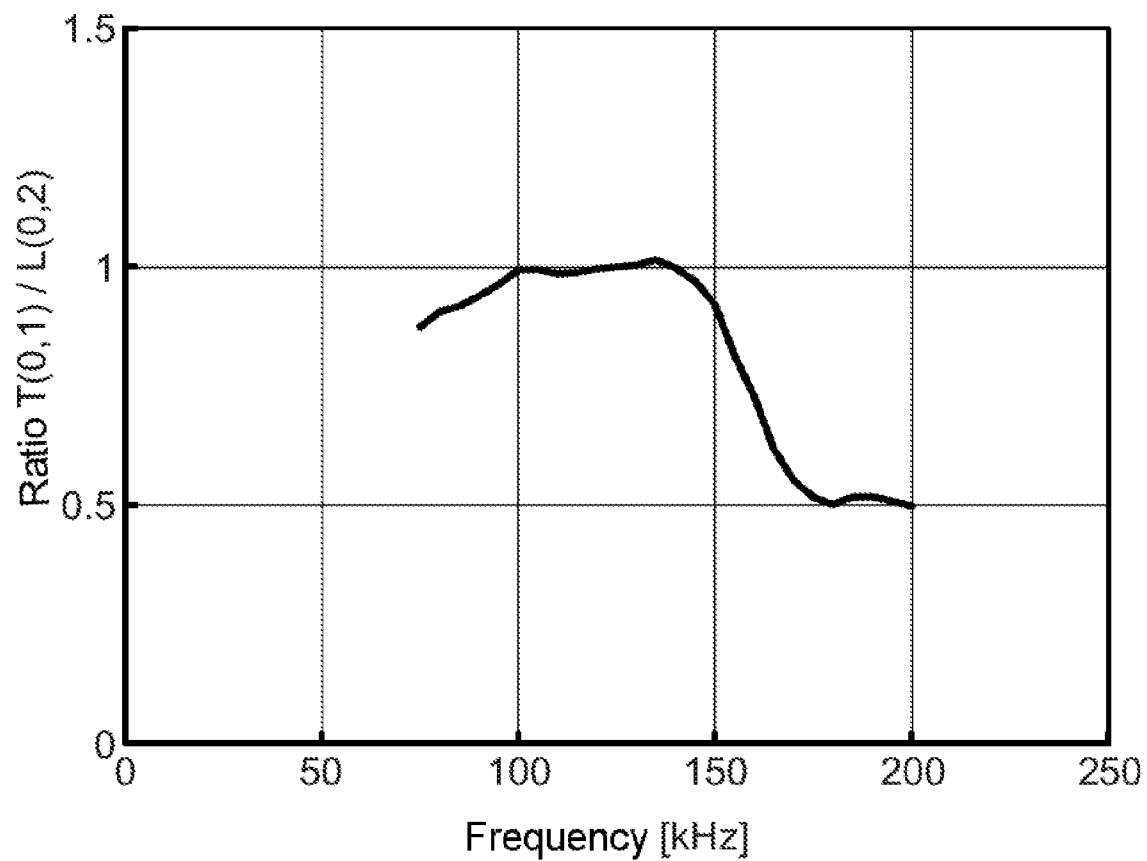
FIG. 5 shows a graph of the ratio of detected amplitudes of the T(0,1) mode with respect to the L(0,2) mode against the frequency of the ultrasonic waves in a steel pipe as a component.

FIG. 5 illustrates the amplitude ratio of the T(0,1) mode to the L(0,2) mode in a pipe 2.

This is shown, by way of example, for different frequencies. The amplitude of the horizontally polarized transverse wave 4 of the T(0,1) mode reflected at the edge of the pipe in the axial direction was compared with the amplitude of the vertically polarized transverse waves 7 of the L(0,2) mode emitted in the axial direction in the peripheral direction. For 100 kHz, the amplitude ratio of both waves is 1, at 200 kHz, the considered echo of the T(0,1) wave exhibits only half the amplitude of the L(0,2) mode for the selected geometrical relationship.

The invention claimed is:

1. Method for the non-destructive testing of walls of components; fixing at least one ultrasonic transducer to a surface of the wall which transducer is a piezoelectric transducer and is used to emit horizontally polarized transverse waves in a lateral propagation direction substantially parallel to a central longitudinal axis on the surface of the wall being tested and compression waves or vertically polarized transverse waves in a radial propagation direction substantially perpendicular to the central longitudinal axis of the wall being tested in the wall of the component;

detecting horizontally polarized transverse waves reflected from defects by the at least one ultrasonic transducer and/or at least one further ultrasonic transducer arranged at a known distance from the at least one ultrasonic transducer on the wall being tested of the component; and determining the thickness of the wall being tested with compression waves or vertically polarized transverse waves after or while detecting the defects by the ultrasonic transducer.

2. The method according to claim 1, detecting amplitude and/or travel time of the horizontally polarized transverse waves reflected by defects and the amplitude and/or the travel time of the compression waves or the vertically polarized transverse waves in order to determine the thickness of the wall being tested.

3. The method according to claim 1 emitting the horizontally polarized transverse waves in the lateral propagation direction and the compression waves or the vertically polarized transverse waves in the radial propagation direction with a frequency in the range of 10 kHz to 1 MHz.

4. The method according to claim 1, wherein the at least one ultrasonic transducer is embedded or laminated in an elastically deformable material on the component.

5. The method according to claim 1, fastening the at least one ultrasonic transducer to the component by means of a sleeve running over the periphery of the wall being tested.

* * * * *